US 6,714,155 B1

(12) United States Patent
Rose (10) Patent No.: US 6,714,155 B1
(45) Date of Patent: Mar. 30, 2004

(54) METHOD OF PASSIVELY ESTIMATING AN EMITTER'S POSITION AND VELOCITY USING BEARINGS-ONLY WITHOUT REQUIRING OBSERVER ACCELERATION

(75) Inventor: Conrad Rose, King George, VA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 10/419,193

(22) Filed: Apr. 21, 2003

(51) Int. Cl.[7] .................. G01S 13/58; G01S 13/08; G01S 3/80
(52) U.S. Cl. .................. 342/107; 342/113; 342/108; 342/146; 367/124
(58) Field of Search .................. 342/107, 108, 342/109, 113, 20, 146, 189; 367/124

(56) References Cited

U.S. PATENT DOCUMENTS

| | | | | |
|---|---|---|---|---|
| 5,610,609 A | * | 3/1997 | Rose | 342/13 |
| 5,689,274 A | * | 11/1997 | Rose | 342/417 |
| 5,774,087 A | * | 6/1998 | Rose | 342/13 |
| 5,877,998 A | * | 3/1999 | Aidala et al. | 367/124 |
| 6,580,387 B2 | * | 6/2003 | Kronhamn | 342/146 |

OTHER PUBLICATIONS

A closed–form solution to bearings–only target motion analysis Nardone, S.C.; Graham, M.L.; Oceanic Engineering, IEEE Journal of, vol.: 22 Issue: 1 , Jan. 1997 pp. 168–178.*

Observability of target tracking with bearings–only measurements Taek Lyul Song; Aerospace and Electronic Systems, IEEE Transactions on , vol.: 32 Issue: 4 , Oct. 1996 pp. 1468–1472.*

Nth–order dynamics target observability from angle measurements Fogel, E.; Gavish, M.; Aerospace and Electronic Systems, IEEE Transactions on, vol.: 24 Issue: 3, May1988 pp. 305–308.*

* cited by examiner

Primary Examiner—Thomas H. Tarcza
Assistant Examiner—Brian Andrea
(74) Attorney, Agent, or Firm—Lowe Hauptman Gilman & Berner, LLP (57) ABSTRACT

A method of estimating emitter range and heading from bearing measurements without requiring observer heading change or observer acceleration during the bearing measurement collection period. Emitter signal characteristics are measured and a set of parameters characterizing a specific emitter as a signal source are generated based on the measured characteristics. Based on the emitter characterization and an emitter-platform association data base, a most probable platform including the emitter is identified and the emitter operating mode and corresponding specific platform are associated with a particular kinematic regime. A platform performance data base is used to (1) derive a speed value based on the kinematic regime, (2) generate emitter bearings based on the measured emitter characteristics, (3) estimate the emitter speed based on the emitter bearings, and (4) determine the emitter range based on a comparison of the continuous speed value with a discrete speed value derived based on the platform performance data base.

26 Claims, 7 Drawing Sheets

METHOD OF PASSIVELY ESTIMATING AN EMITTER'S POSITION AND VELOCITY USING BEARINGS-ONLY WITHOUT REQUIRING OBSERVER ACCELERATION

RELATED APPLICATION

The present application is related to co-pending patent application entitled "A Method for Determining the Optimum Observer Heading Change in Bearings-Only Passive Emitter Tracking" (Docket No. BD-01-145 (3351-068)) and assigned to the instant assignee and filed on even date herewith and is hereby incorporated by reference into this specification in its entirety.

FIELD OF THE INVENTION

The present invention relates generally to Electronic Surveillance Measures (ESM) intercept receivers, and more particularly, to a method for passively estimating an emitter's position and velocity using bearings-only without requiring observer acceleration.

BACKGROUND OF THE INVENTION

ESM intercept receivers are used to collect radar data, and in particular, to perform a pulse parameter measurement function. Pulse parameter measurements are used to type or "fingerprint" radar systems. The measurements include the traditional parameters such as pulse time of arrival (TOA), pulse width (PW), amplitude, and frequency, and also pulse internals, such as modulation, as is known to persons of skill in the art.

ESM systems also typically measure emitter bearing in azimuth and, less commonly, elevation. The emitter azimuth or bearing is used to sort the many interleaved pulses from diverse radars obtained in a single wideband receiver dwell. These bearings can also be utilized across several dwells to support a significant additional capability: passive estimation of a moving emitter's range and velocity.

Figure 1A:
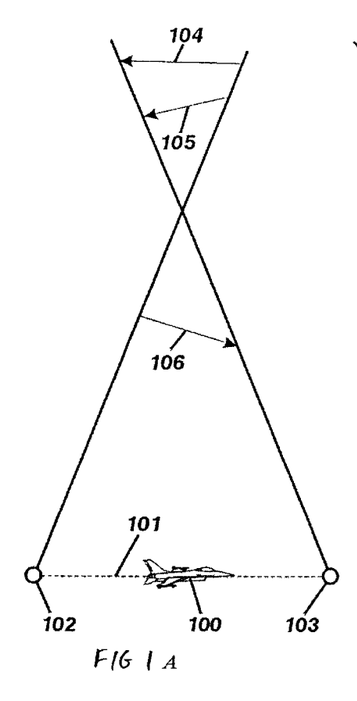
FIG. 1A is a diagram graphically depicting that an emitter's range and velocity derived from bearing measurements is ambiguous if the observer flies a constant velocity track.

As described by Fogel and Gavish, "$N^{th}$-Order Dynamics Target Observability from Angle Measurements", *IEEE Transactions on Aerospace and Electronic Systems*, AES-24, 3 (May 1988), conventional bearings-only passive emitter tracking requires the observer to maneuver during the sequence of receiver dwells used to collect the angle measurements. FIG. 1A illustrates an observer maneuver for an important special case of a constant velocity emitter. With reference to FIG. 1A, an observer 100 flies a constant velocity track 101 between a point where a first bearing cut 102 and a last bearing cut 103 was made. An infinite number of target tracks could produce a measured azimuth change. Examples of these ambiguous tracks are indicated by reference numerals 104, 105 and 106.

Figure 1B:
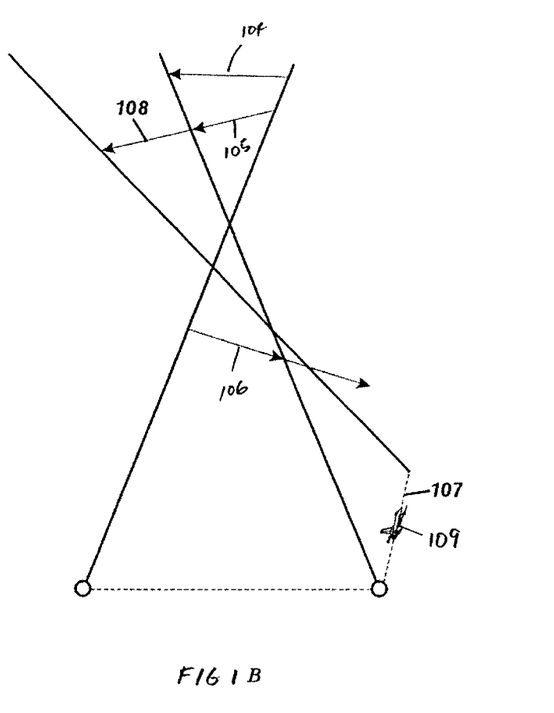
FIG. 1B is a diagram graphically depicting how the ambiguity of FIG. 1A is resolved in conventional bearings-only passive emitter tracking by the observer flying a second distinct constant velocity leg.

Technically, the target track is said to be "unobservable" (Kalman, Ho and Narenda, "Controllability of Linear Dynamical Systems," *Contributions to Differential Equations*, Vol I, McMillan, New York, 1961). As Fogel and Gavish show, obtaining observability in this case requires an observer acceleration, as illustrated in FIG. 1B. An observer 109 changes heading and flies a new track 107. Now only emitter constant velocity track 108, the extension of track 105, fits the three lines-of-bearing.

Because emitters predominantly follow piecewise constant tracks, observers typically fly constant velocity legs of short duration to estimate range, speed and heading. Thus, prior methods of bearings-only target tracking, such as the one described by U.S. Pat. No. 5,877,998 to Aidala, et al. entitled "Recursive Method for Target Motion Analysis," emphasize such observer kinematics. Disadvantageously, obtaining a range estimate using the above method requires an observer to execute a turn. That is, the target is located only after the second leg has begun. Hence, Aidala et al. notes it is an object of his invention "to provide an improved method . . . for providing range estimates as soon as two measurement legs of data become available."

Requiring the observer to maneuver in order to locate a moving emitter is very limiting, especially for aircraft. Since the emitter's range and velocity are not known before the maneuver, performing the maneuver can easily put the observer in an undesirable tactical position relative to the emitting platform. Also such maneuvers require aileron and other control surface deflections, and significant bank angles, which increase the observer's radar cross section. Hence, especially for stealth aircraft, these required turns can be extremely detrimental.

Also, deriving range, speed and heading from bearings alone does not utilize all the information ESM systems typically extract from pulse measurements of a target. These extracted parameters may allow the ESM system to categorize both the target aircraft type and overall mission. They may also allow determination of the aircraft intent during the pulse collection period. Once target aircraft platform type and intent are known it is possible to bracket target speeds within a very narrow range. Such bracketing is possible because aircraft generally do not travel at arbitrary speeds within their flight envelope. Aircraft optimize speed to match the requirements of their particular mission.

Examples of typical aircraft missions include surveillance, escort and intercept. These missions involve cruise, loiter, supersonic dash, and missile launch flight regimes. Performance in each of these regimes is determined, for a given altitude, weight and configuration, by the particular aircraft's thrust or power available, $P_a$, and power required $P_r$. As shown in aerodynamics textbooks, e.g. D. P. Raymer's *"Aircraft Design: A Conceptual Approach,"* American Institute of Aeronautics and Astronautics, Washington, D.C. 1989, $P_r$ depends on the lift and drag coefficients $C_D$ and $C_L$ specific to the aircraft airframe.

Figure 2:
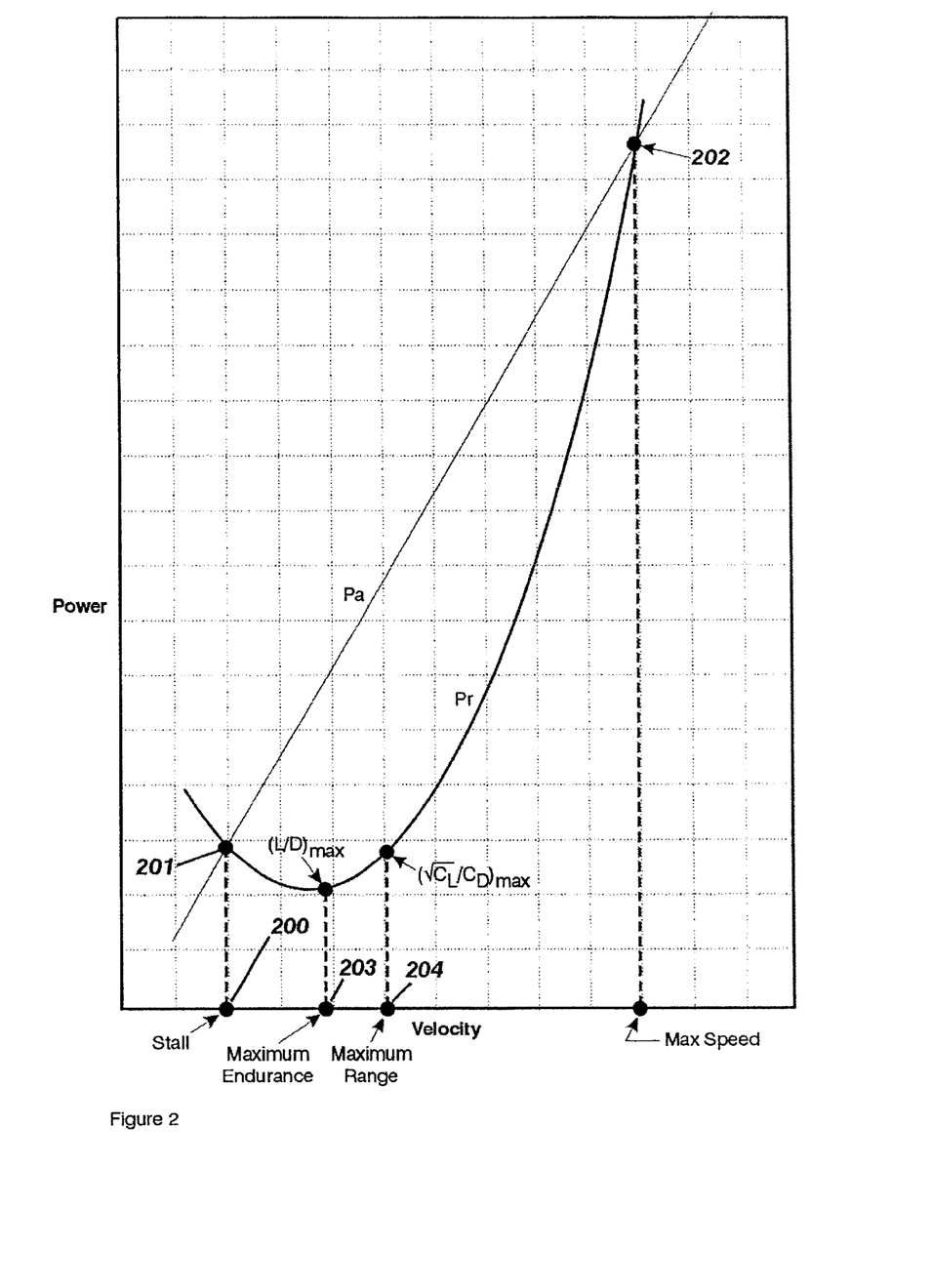
FIG. 2 is a graph of a typical power-available and power-required plot versus speed wherein the relationships derived from such plots determines the optimum aircraft speeds best satisfying many mission requirements.

FIG. 2 illustrates some of the discrete performance speeds determined from $P_a$ and $P_r$ curves for a turbojet aircraft type at a fixed altitude and weight. Raymer describes the use of such $P_a$–$P_r$ curves in determining best aircraft speed for a given performance requirement. Although jet aircraft performance will be used as examples here, piston and turboprop results are entirely analogous. The minimum value at $P_r$ 200 gives the speed 203 requiring minimum thrust. Intersection of $P_a$ and $P_r$ 201 gives the speed at which the aircraft stalls, while intersection 202 gives the maximum speed attainable. The maximum endurance, or longest time-in-the-air speed is indicated by reference numeral 203, which is also the speed giving the maximum lift-to-drag ratio, i.e. the maximum $L/D_{max}$. The maximum range speed is located at point 204, which is also the speed, at any altitude, weight and configuration, for which $\sqrt{C_L}/C_{D\,max}$ is maximum. Other discrete speeds such as for best rate-of-climb are similarly determined for a particular aircraft type depending on the aircraft performance curve.

Thus, a need exists in the art for a method for passively estimating an emitter's position and velocity using bearings only that does not require observer acceleration.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

SUMMARY OF THE INVENTION

Thus, an object of the present invention is to obtain emitter range and heading from bearing measurements without requiring a constant acceleration, or any other observer maneuver.

It is also an object of the present invention to estimate elements of the target track sequentially, and not just in parallel. The sequential order is relative heading, and speed as a function of range and, separately, speed from ESM radar identification parameters, then absolute emitter heading and range.

The present invention overcomes the requirement to maneuver in order to determine bearings-only range by utilizing the fact that aircraft must fly at certain discrete speeds to successfully accomplish their mission, and that these speeds can be determined from ESM parameters derived from the signal.

Therefore, in the present invention both relative heading and speed as a function of range are initially found from bearing measurements. The bearings used to generate them can be measured during a constant velocity leg, without requiring the maneuver intrinsic to conventional target motion analysis or TMA. A separate discrete speed estimation process also occurs in parallel after platform identification. Once the discrete speed is estimated, range and absolute heading are determined from the continuous speed functional relation.

Thus, a further object of the present invention is to derive the discrete emitter speed estimate $s_{est}$ from the radar fingerprinting process rather than the bearing measurements. ESM parameters such as pulse width, pulse time-of-arrival, pulse time-of-arrival frame interval and pulse rate interval (PRI) stagger levels, can uniquely determine the radar and its mode of operation. Knowledge of the radar and mode determine the aircraft and aircraft's flight regime. The aircraft's flight regime determines its speed.

These and other objects of the present invention are achieved by a method of estimating target range and heading from bearing measurements without requiring observer heading change or observer acceleration during the bearing measurement collection period including measuring the emitter signal frequency, time and phase characteristics, generating from these measurements a set of parameters that characterize a specific emitter as a signal source, identifying, based on the emitter characterization and an emitter-platform association data base, a most probable platform the emitter is on and associating the mode of operation of the emitter and the corresponding specific platform with a particular kinematic regime, and utilizing a performance data base to derive based on the kinematic regime a specific speed or discrete set of speeds best adapted to the platform's mission, while also generating from the measured emitter characteristics the emitter bearings, estimating from emitter bearings the emitter speed as a continuous function of emitter range, then determining, by comparing the continuous speed with the discrete speed derived from the platform performance data base, the emitter range consistent therewith, and assigning an accuracy figure of merit to the range estimate, where the accuracy is determined from the predicted variance in the discrete speed estimate, and the continuous speed function.

In a computer-readable medium aspect, the medium includes a data structure for an emitter-platform association data base, a data structure for a performance data base, and a sequence of machine executable instructions in machine form. The sequence of instructions cause the processor to determine characteristics of a measured emitter signal and generate a set of parameters characterizing a specific emitter as a signal source based on the determined characteristics. A most probable platform including the emitter based on the generated parameters and the emitter-platform association data base is identified and the emitter operating mode and corresponding specific platform are associated with a particular kinematic regime. The platform performance data base is used to (1) derive based on the kinematic regime one or more speed values best adapted to the platform mission, (2) generate based on the emitter signal measurement the emitter bearing, (3) estimate from the emitter bearing the emitter speed as a continuous function of emitter range, and (4) determine the emitter range consistent therewith by comparing the continuous emitter speed with the one or more speed values derived from the performance data base.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

DESCRIPTION OF THE PREFERRED EMBODIMENTS

The following demonstrates how, once speed is known, range and heading can be found from bearings measured during a constant velocity leg. Note that the range r and emitter bearing θ satisfy, for constant velocity emitter, the differential equations.

$$\ddot{r} - r\dot{\theta}^2 = 0 \quad \text{(Eq 1a)}$$

$$r\ddot{\theta} + 2\dot{r}\dot{\theta} = 0 \quad \text{(Eq 1b)}$$

which can be manipulated into $$\frac{d}{dt}\left(\frac{\dot{r}}{r}\right) + \left(\frac{\dot{r}}{r}\right)^2 - \dot{\theta}^2 = 0 \quad \text{(Eq 2a)}$$

$$\ddot{\theta} + 2\left(\frac{\dot{r}}{r}\right)\dot{\theta} = 0$$

As Equation 2b indicates, the quantity range-rate over range, $\dot{r}/r$, can be obtained from bearing-change estimates $\dot{\theta}$ and $\ddot{\theta}$, i.e.

$$\frac{\dot{r}}{r} = -\frac{\ddot{\theta}}{2\dot{\theta}} \quad \text{(Eq 3)}$$

This shows the quantity is observable without maneuvering, and this implies further that emitter relative heading $h_r$ is also observable because:

$$h_r = \tan^{-1}\left(\frac{\frac{\dot{r}}{r}\cos(\theta) - \dot{\theta}\sin(\theta)}{\frac{\dot{r}}{r}\sin(\theta) + \dot{\theta}\cos(\theta)}\right) \quad \text{(Eq 4)}$$

Thus, the relative velocity $\vec{v}_{rel}$, over range is observable, because in polar coordinates with unit vector along range $\vec{i}_r$ and along angle $\vec{i}_\theta$:

$$\frac{\vec{v}_{rel}}{r} = \left(\frac{\dot{r}}{r}\right)\vec{i}_r + \dot{\theta}\vec{i}_\theta \quad \text{(Eq 5)}$$

and hence all allowable relative velocities $\vec{v}_{rel\,try}$ consistent with the bearing measurements can be parameterized by the candidate ranges $r_{try}$, i.e.:

$$\vec{v}_{rel\,try} = r_{try}\left(\frac{\dot{r}}{r}\right)\vec{i}_r + r_{try}\dot{\theta}\vec{i}_\theta \quad \text{Eq (6)}$$

The corresponding emitter velocity $\vec{v}_{emt\,try}$ can then be found from knowledge of the observer's velocity $\vec{v}_{obs}$:

$$\vec{v}_{emt\,try} = \vec{v}_{rel\,try} + \vec{v}_{obs} \quad \text{Eq (7)}$$

and the correct range found by comparing the magnitude of the candidate velocity with the estimated speed $s_{est}$, i.e.:

If $s_{est} = \|\vec{v}_{emtry}\|$ then range = $r_{try}$

Figure 3A:
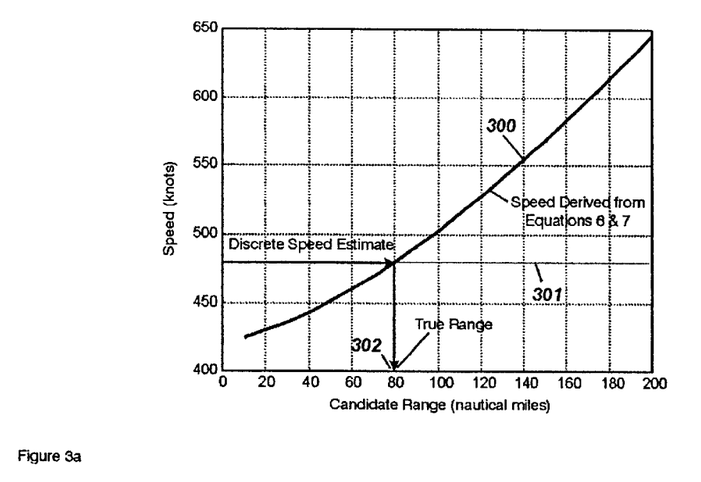
FIG. 3a is a graph of an example result of making emitter speed a function of emitter range using bearing measurements, and how the range is determined from a second speed estimate made utilizing information about emitting radar type, aircraft mission and data correlating optimal speed and mission requirement, such as the data shown in FIG. 2.

FIG. 3a illustrates this test graphically for a simulation for a 480 knot emitter at 80 nmi with a 30° relative bearing. The observer was flying 420 knots. The receiver revisit rate was 100 msec for two seconds. The intersection of the estimated target speed 301 with the range-mapped-into-speed-via-bearing-change curve 300 gives the true range 302.

Although Equation 1 is in polar coordinates and does not assume observer or emitter accelerations (the right hand sides are 0), both observer and emitter accelerations can be readily incorporated. Also the above analysis holds if elevation and not just azimuth is available, e.g. Equation 1 is generalized to spherical coordinates.

Figure 3B:
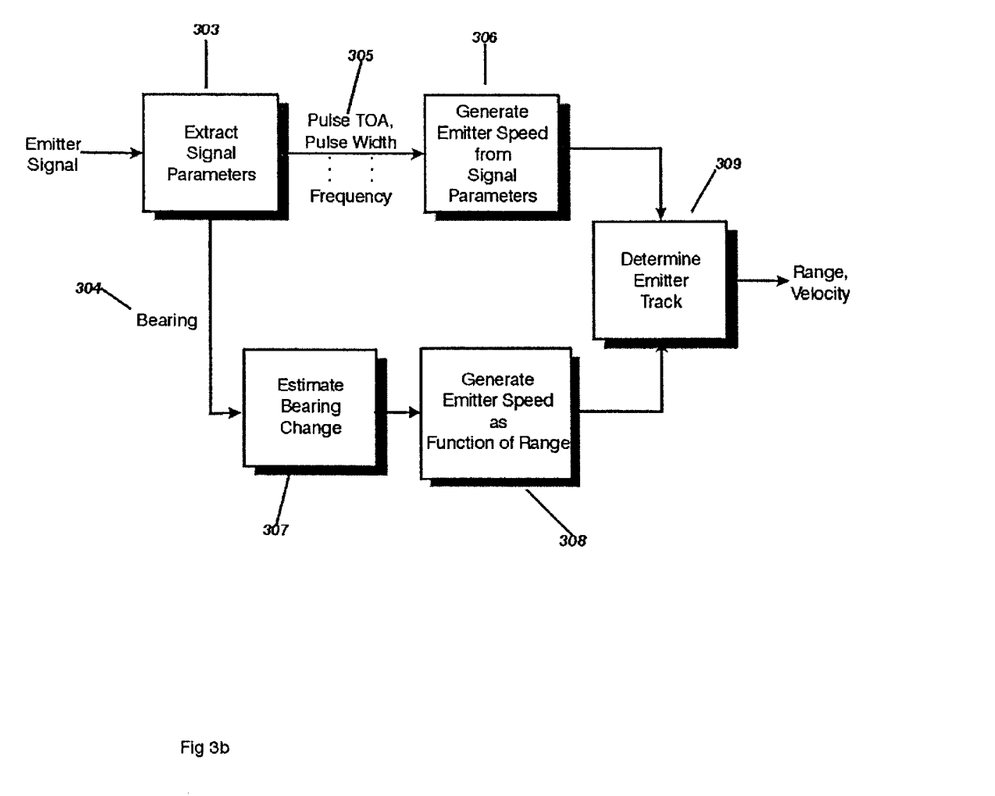
FIG. 3b is a top level block diagram of an embodiment according to the present invention showing that, unlike conventional bearings-only target-motion-analysis, discrete target speeds are estimated from parameters used to identify the radar, while a continuum of target speeds is estimated from bearing measurements, with speed a function of target range.

FIG. 3b is a top level block diagram of the process flow according to an embodiment of the present invention. Emitter signal parameters are extracted (step 303) at each receiver dwell. These parameters must always include bearing 304, and additional parameters 305 such as pulse TOA, pulse width and frequency sufficient to identify the emitter platform. The identified platform is associated with a most likely speed at step 306 and the bearings are filtered (step 307) to produce estimates of their first and second derivatives with respect to time. The bearing rate estimates are then used to generate speed as a continuous function of range at step 308 using the relations shown, for example, in Equations 3, 4, and 5. Emitter range and heading is then determined at step 309 by logic comparing the discrete speed output from step 306 and continuous bearing-rate determined speed output from step 308.

No observer maneuver is required. But, as noted, a similar analysis can be performed incorporating observer accelerations on the right-hand side of Equation 1. Thus, the method is not restricted to constant velocity observer tracks. Furthermore, target accelerations, as well as speeds, may be deduced from ESM data. If so, these acceleration estimates can also be incorporated in Equation 1. Thus, the method is not restricted to a constant velocity target.

Figure 4:
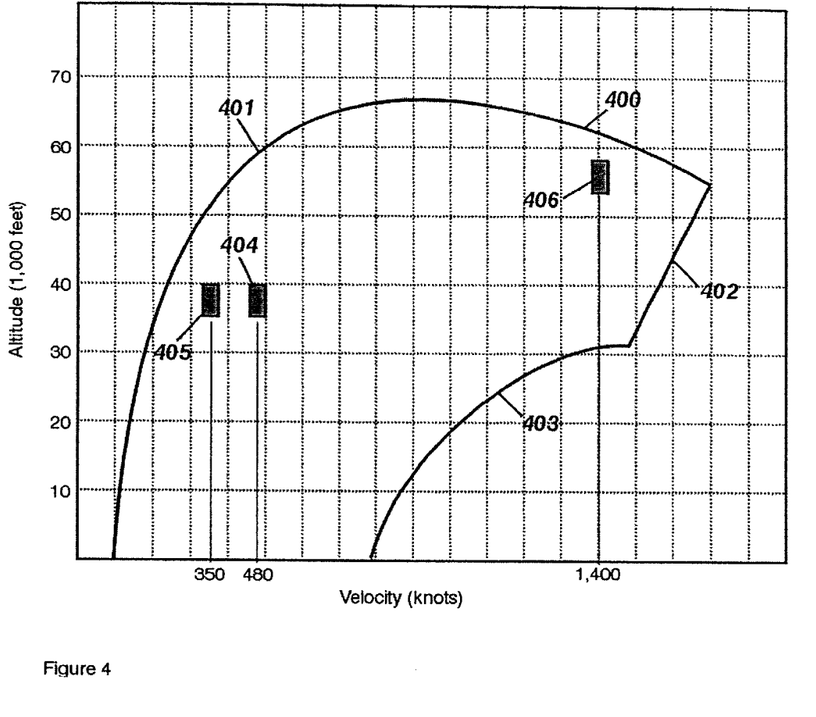
FIG. 4 is a graph of a typical jet fighter flight envelope, and illustrates the relatively small portions altitude-velocity pairs actually occupy for common flight regimes.

Determining the required target potential speeds in process step 306 is based partially on data equivalent to the emitter airframe's flight envelope. FIG. 4 is an example of such a flight or "operating" envelope depicting the combinations of altitude and speed the aircraft has been designed to withstand. FIG. 4 depicts the envelope for a typical fighter, consistent with the $P_a$–$P_r$ curves in FIG. 2. The upper portion of the curve 400 is the maximum ceiling, which is determined by the aircraft powerplant's maximum thrust. The low speed boundary to the left is limited by the stall and buffet limit. The high-speed, high-altitude limit 402 on the right is the result of aerodynamic heating, while the lower portion of the high speed boundary 403 is limited by structural heating and dynamic pressure.

Although the operating envelope for the aircraft extends over a wide altitude and speed range, the jet will operate in only a very narrow region when in a specific mode of operation. Thus for most efficient cruising performance, the aircraft will be at a speed near 204 (FIG. 2) and at an altitude determined by the powerplant's characteristics. In particular, turbojets produce greater speed for a given amount of thrust, and have lower inlet air temperatures and hence lower fuel consumption at higher altitudes. Such considerations determine the specific altitude associated with the $P_a$–$P_r$ curve. And the altitude plus $P_a$–$P_r$ curves determine the region 404 (FIG. 4) the jet will be in for cruise operation. If, rather than a cruise operation, the aircraft is in a loiter operation mode, the aircraft must fly at a speed near point 203 (FIG. 2) in order to achieve maximum endurance. A speed near point 203 is about 75% slower than the best range speed, and thus the aircraft's speed-altitude pair will fall in region 405. Similar considerations and analyses show that if the aircraft is in supersonic intercept mode it will most likely be in a small, unique altitude-speed region such as 406.

The region in the flight envelope, e.g., specific regions 404, 405 or 406, that the aircraft is operating can be determined from the aircraft radar's mode of operation. Typical modes for radar found on intercept aircraft are search, track, illuminate and target. Modes found on surveillance type aircraft are search and track. Thus, if the ESM parameters extracted from the intercepted signal indicate the radar is found on an airborne warning and control system (AWACS) type aircraft operating continuously in a search and track mode, then the aircraft is most likely at its maximum time-of-flight speed. The association of radar mode with aircraft speed is described below in more detail.

Figure 5:
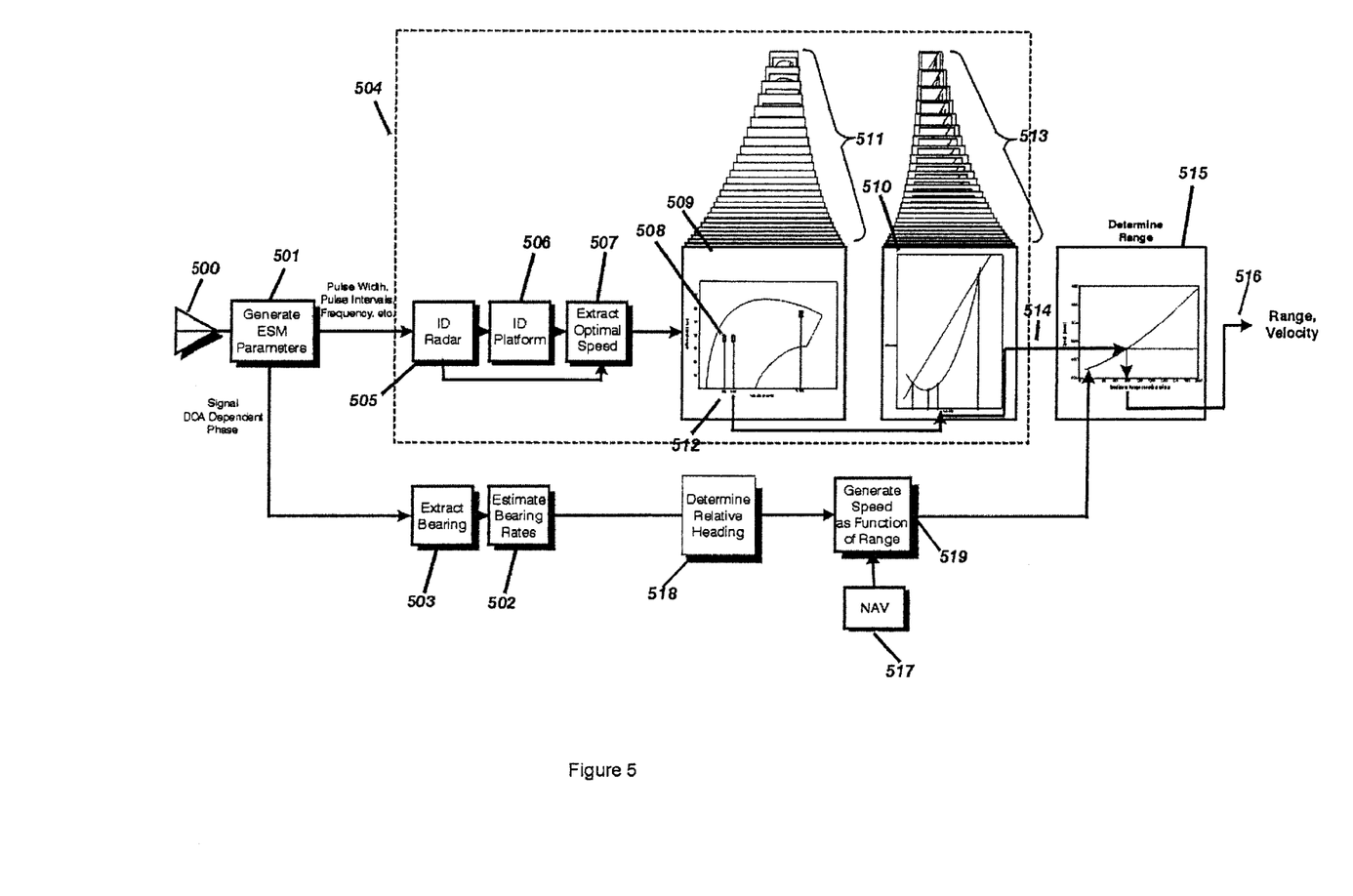
FIG. 5 is a detailed diagram of an embodiment according to the present invention showing, in particular, how the data relations illustrated in FIG. 2 and FIG. 4 allow a unique emitter range to be determined.

FIG. 5 depicts a block diagram of a detailed implementation of an embodiment according to the principles of the present invention. Because the derived range depends on the bearing rates of change, a preferred sensor 500 is a short-baseline/long-baseline interferometer (SBI/LBI) as described in Kaplan, U.S. Pat. No. 4,734,702, "Passive Ranging Method and Apparatus", incorporated herein by reference in its entirety. The long baseline interferometer provides excellent bearing resolution, and supports measuring very accurate bearing rates-of-change.

For most robust operation, the SBI should incorporate an elevation array. Elevation measurements help resolve ambiguities in range created by two or more speed estimates from a process 504. Process 504 allows for the fact that multiple speeds can occur when the radar identification does not lead to a unique platform identification. With elevation information available to provide an estimate of altitude corresponding to the given range, the ambiguity can be resolved using flight envelope and other altitude dependent data for the candidate platforms. Examples of other altitude dependent data are load factor limits, maximum turn rates, and corner speed. The use of this latter data does not imply the emitting aircraft is maneuvering, but that the altitude may not be consistent with maneuvers required by the flight regime deduced from the radar mode. If the altitude derived from the range estimate and elevation measurement does not give results consistent with the aircraft's immediate mission, the range can be eliminated.

Process step 501 involves conventional ESM parameter extraction. The SBI phase measurement ambiguities are resolved, and bearing and possibly elevation estimates (step 503) derived therefrom. The derived estimates are used to resolve the LBI utilizing the method described by Kaplan. The bearing and, if measured, elevation estimates are input to step 502 to estimate the first and second derivatives with respect to time.

Before process step 503 estimates the angles, process step 501 must separate or deinterleave and cluster the pulses for each radar detected in the receiver dwell. Once the pulses are clustered, pulse width and other radar discriminants can be measured, as well as signal direction-of-arrival (DOA). If DOA is used as a pulse sorting aid rather than derived in step 503 after deinterleaving, the number of receiver channels must support monopulse phase measurements.

A particularly important parameter extracted from pulse time-of-arrival measurements is the greatest common divisor of all the interpulse time intervals. This time difference is extremely useful in process step 504, which corresponds to step 306 (FIG. 3b) and in particular in step 505 extracting the radar's identifier (ID). Therefore, it is desirable that the deinterleaver have the capabilities of the Litton Industries Advanced Division's deinterleaver developed for the AN/ALQ-99 jamming system, which extracts the divisor quantity from the pulse TOA measurements as part of the pulse deinterleaving process.

Typically, process step 504 includes the steps of identifying the radar (step 505), and determining the platform (step 506) based on the radar type. Identifying the radar is a well established ESM function. Carrier frequency measurement alone is not especially useful in the identification process, but carrier frequency may be combined with TOA measurements, and in particular greatest common divisor estimates, according to the inventor's U.S. Pat. No. 5,534,866, entitled "Emitter Frequency-Time Measurement by a Moving Observer Using No Navigation Input" to obtain additional parameters unique to a given radar. U.S. Pat. No. 5,534,866 is incorporated herein by reference in its entirety. Such time-frequency parameters can be very useful in determining not only the radar, but also the particular mode of operation. Thus, in process step 505 the radar mode is also determined, e.g. search or illuminate. The radar mode and platform capabilities determine the platform mission, and hence the flight mode, e.g., loiter, cruise or intercept. This correlation between mission and flight mode during the pulse collection period is performed in process step 507. Thus, the mission determines which region 508 in the flight envelope 509 the identified aircraft platform is operating.

The flight envelope data 509 is specific to each platform. Therefore, the database must encompass all platforms of importance to the observer, e.g. reference numeral 511 represents the flight envelope data base. Thus, process step 507 determines not just the operating region, but the appropriate data set.

The speed boundary 512 given by the flight envelope data 509 may be broad, e.g. 15% possible speed variation or more. The speed is further bounded by refining the estimate using progressively more restrictive performance data. This refinement is indicated by the power curves 510, corresponding to FIG. 2. For the same platform, there are a set of curves 513, each corresponding to a different altitude and aircraft weight or configuration. Thus, these and other independent variables must be determined by establishing the region 508 and platform type in process step 507. Although the power-available power-required functions have been emphasized, there are many other performance determinants, such as load factor and turn rate that depend on speed and altitude. Also pilots may fly certain preferred speeds to simplify time-distance calculations. All such data for a given platform is used to systematically refine the speed estimate to a 5% or less variation range.

The preferred method for obtaining the speed-altitude bounds from radar mode and platform ID, and then progressively narrowing the speed bound is to use rules based on fuzzy expert system theory (R. Kruse, J. Gebhardt, and F. Klawonn, *Foundations of Fuzzy Systems*, John Wiley and Sons, New York 1994). A fuzzy expert system is an expert system that uses a collection of fuzzy membership functions and rules, instead of Boolean logic, to reason about data. Under fuzzy logic more than one inference is possible. Hence, more than one speed and altitude region 508 may be output to the specific performance refinement 510.

If there is only one speed-altitude region, a unique speed 514 is determined in the above processing. This speed in turn gives a unique range estimate 516 using the method described previously. The continuous speed curve in 515 (i.e. 300 in FIG. 3b) is a function of emitter relative heading. The sensitivity to errors in the discrete speed estimate is thus also a function of relative heading. The sensitivity is known from the slope of the curve, and thus can be used to predict possible error in the range estimate.

The continuous speed function is generated from the relative heading vector. The relative heading vector is found (step 518) directly from the bearing and bearing rates with range as a parameter. Emitter velocities consistent with the bearings and bearing rates are then generated in step 519. This requires the observer's velocity vector from the navigation system 517. The emitter velocities are thus also parameterized by range. The continuous speed function, e.g. curve 300 (FIG. 3), is the magnitude of this velocity.

Advantageously, the method of the present invention does not require the observer to make a heading change or other acceleration during the bearing collection period, but it does not restrict the observer's motion either. Thus, if the navigation (NAV) system 517 measures observer accelerations, these are, effectively, incorporated into the right hand side of Equation 1. Also, the platform and mission identification process may indicate the emitter is likely to be maneuvering. Such possible observer accelerations are readily incorporated into the above kinematic analysis. When incorporating possible target accelerations, more than one speed estimate generally results. If the fuzzy logic generates several speed-altitude pairs, the ambiguity can be resolved if elevation measurements are available.

Figure 6:
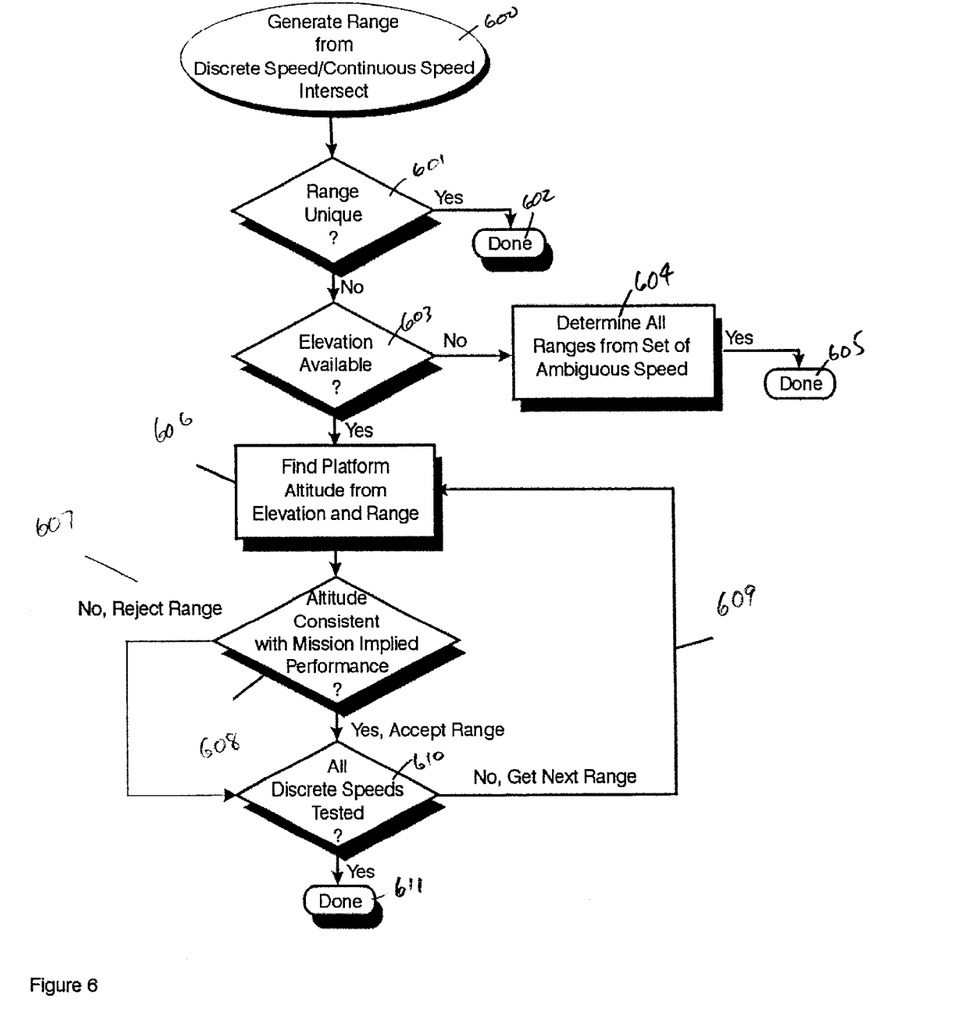
FIG. 6 is a flow chart showing how, given several equally likely discrete speeds, and hence range estimates, the ambiguity may be resolved using elevation measurements.

FIG. 6 shows the method for resolving speed-altitude ambiguities. At step 600, range is generated from a discrete speed/continuous speed intersect. At step 601, a unique range determination is performed. If the range is not unique, then the process is complete at step 602. If the range is not unique, then at step 603 an available elevation determination is performed. If the elevation is not available, then at step 604, all ranges are determined from set of ambiguous speed and the process is complete at step 605. In step 606, the elevation measurement and range estimate are used to determine the platform altitude. The platform altitude is compared with the altitudes consistent with step 508, found from the flight performance data base. If the altitude regions do not overlap based on the determination performed in step 608, the range estimate is rejected at step 607 and the next candidate range 609 is tested until the set of ambiguous range is exhausted.

Although air-to-air TMA has been emphasized here and aircraft performance characteristics used to illustrate speed determination, it is clear the same approach can be used for ship-to-ship TMA and also air-to-surface. In most cases the implementation will be simpler in such applications because the performance regions are much more limited. For example, there is no altitude dependence. Also, weight and configuration have a much smaller impact on speed variation.

For air-to-air, the method may be implemented in a highly specialized way used against only a small subset of critical platforms, possibly with their radar operating only in certain restricted modes. Such limited application greatly reduces the data base and simplifies the logic implementation.

It will be obvious to those familiar with emitter passive tracking how to make the specializations required to apply the invention to these and other particular applications. In all implementations, when accelerations are incorporated there may be additional range dependencies that must be accounted for. It also will be clear to those familiar with emitter passive tracking how to make the obvious modifications to account for these additional dependencies.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only b the definition contained in the appended claims and equivalents thereof.

What is claimed is:

1. A method of estimating target range and heading from bearing measurements without requiring observer heading change or observer acceleration during the bearing measurement collection period, comprising the steps of:

measuring an emitter signal frequency, time and phase characteristics;

generating from the emitter signal frequency, time and phase characteristic measurements a set of parameters characterizing a specific emitter as a signal source;

identifying, from the emitter characterization and an emitter-platform association data base, a most probable platform the emitter is on and associating the mode of operation of the emitter and the corresponding specific platform with a particular kinematic regime;

utilizing a performance data base, deriving from the kinematic regime a specific speed or discrete set of speeds best adapted to the platform's mission and generating from the measured emitter characteristics the emitter bearings, estimating from the emitter bearings the emitter speed as a continuous function of emitter range, and determining the emitter range consistent therewith by comparing the continuous emitter speed with the specific speed or the discrete speed derived from the performance data base; and assigning an accuracy figure of merit to the range estimate, where the accuracy is determined from the predicted variance in the discrete speed estimate, and the continuous speed function.

2. The method of claim 1, wherein the estimate of speed as a function of range is generated from bearing first and second derivatives with respect to time, the derivatives estimated from the bearing measurement and incorporating into the speed estimate measurement of any observer acceleration occurring during the bearing measurement period, along with any emitter acceleration predicted by the particular kinematical regime.

3. The method of claim 1, wherein the bearing first and second derivatives with respect to time are estimated from two or more long baseline interferometer phase measurements differenced between phase measurement update times such that any fixed phase measurement bias errors cancel in the differencing.

4. The method of claim 3, wherein a short baseline interferometer measurement is used to predict phase on the long baseline interferometer baseline, and hence resolve the long baseline interferometer phase difference measurement modulo $2\pi$ integer ambiguity.

5. The method of claim 1, comprising generating a bearing and producing an emitter elevation angle and an azimuth angle, and wherein the discrete speed ambiguity is reduced resulting in a unique range estimate, by utilizing the elevation angle and determined discrete range to estimate the emitter platform's altitude, comparing the estimated altitude with the altitude associated with the discrete speed in the performance data base and accepting the range estimate only if the estimated altitude and database altitude are consistent.

6. The method of claim 5, wherein the estimate of speed as a function of range is generated from bearing first and second derivatives with respect to time, the derivatives estimated from the bearing measurement and incorporating into the speed estimate measurement of any observer acceleration occurring during the bearing measurement period, along with any emitter acceleration predicted by the particular kinematical regime.

7. The method of claim 5, wherein the bearing first and second derivatives with respect to time are estimated from two or more long baseline interferometer phase measurements differenced between phase measurement update times such that any fixed phase measurement bias errors cancel in the differencing.

8. The method of claim 1, wherein the emitter identifying, the platform associating, and the kinematics derived are not unique and comprising:

estimating, for each emitter-platform-mission-kinematic association the set of optimum discrete speeds;

assigning a likelihood value to each speed indicating the probability of the speed being correct relative to the other speed values in the set, wherein the likelihood value is determined from the probability of correct radar identification, and correct radar-platform association;

determining, by comparison with the continuous speed, the emitter range corresponding to each discrete speed; and assigning the likelihood to the range estimate corresponding to the speed likelihood.

9. The method of claim 8, wherein a bearing generation step produces an emitter elevation angle and an azimuth angle, and wherein the discrete speed ambiguity is reduced or eliminated, resulting in a unique range estimate, by utilizing the elevation angle and determined discrete range to estimate the emitter platform's altitude, comparing estimated altitude with the altitude associated with the discrete speed in the performance data base, and accepting the range estimate only if the estimated altitude and database altitude are consistent.

10. The method of claim 9, wherein the bearing first and second derivatives with respect to time are estimated from two or more long baseline interferometer phase measurements differenced between phase measurement update times such that any fixed phase measurement bias errors cancel in the differencing.

11. The method of claim 8, wherein the estimate of speed as a function of range is generated from bearing first and second derivatives with respect to time, the derivatives estimated from the bearing measurement and incorporating into the speed estimate measurement of any observer acceleration occurring during the bearing measurement period, along with any emitter acceleration predicted by the particular kinematical regime.

12. The method of claim 8, wherein the bearing first and second derivatives with respect to time are estimated from two or more long baseline interferometer phase measurements differenced between phase measurement update times such that any fixed phase measurement bias errors cancel in the differencing.

13. An apparatus for estimating target range and heading from bearing measurement without requiring observer heading change or observer acceleration during the bearing measurement collection period, comprising:

measuring means for measuring an emitter signal frequency, time and phase characteristics;

generating means for generating from the measurements a set of parameters characterizing a specific emitter as a signal source;

identifying means for identifying, based on the emitter characterization parameters and an emitter-platform association data base, the most probable platform including the emitter and associating the mode of operation of the emitter and the corresponding specific platform with a particular kinematic regime;

deriving means for utilizing a performance data base to derive from the kinematic regime a speed best adapted to the platform's mission, generating from the measured emitter characteristics the emitter bearings, estimating from emitter bearings the emitter speed as a continuous function of emitter range, and determining, by comparing the continuous emitter speed with the performance data base derived speed, the emitter range consistent therewith; and assigning means for assigning an accuracy figure of merit to the range estimate, where the accuracy is determined based on the predicted variance in the discrete speed estimate and the continuous speed function.

14. A method of estimating target range and heading from bearing measurements without requiring observer heading change or observer acceleration during the bearing measurement collection period, comprising the steps of:

measuring an emitter signal frequency, time and phase characteristics;

generating from the measurement a set of parameters characterizing a specific emitter as a signal source;

identifying, from the emitter characterization and an emitter-platform association data base, a most probable platform including the emitter and then associating the mode of operation of the emitter and the corresponding specific platform with a particular kinematic regime, and utilizing a performance data base to derive from the kinematic regime a speed best adapted to the platform's mission, and generating from the measured emitter characteristics the emitter bearings, estimating from emitter bearings the emitter speed as a continuous function of emitter range, and determining, by comparing the continuous emitter speed with the performance data base derived speed, the emitter range consistent therewith; and assigning an accuracy figure of merit to the range estimate, where the accuracy is determined from the predicted variance in the discrete speed estimate, and the continuous speed function, wherein generating bearings and producing an emitter elevation angle and an azimuth angle, and wherein the discrete speed ambiguity is reduced, resulting in a unique range estimate, by utilizing the elevation angle and determined discrete range to estimate the emitter platform's altitude, comparing the estimated altitude with the altitude associated with the discrete speed in the performance data base and accepting the range estimate only if the estimated altitude and database altitude are consistent.

15. A method of estimating target range and heading from bearing measurements without requiring observer heading change or observer acceleration during the bearing measurement collection period, comprising the steps of:

measuring an emitter signal having characteristics;

generating based on the emitter signal measurement a set of parameters characterizing a specific emitter as a signal source;

identifying, based on the generated emitter parameter characterization and an emitter-platform association data base, a most probable platform including the emitter and associating the mode of operation of the emitter and the corresponding specific platform with a particular kinematic regime; and utilizing a performance data base, deriving from the kinematic regime one or more speed best adapted to the platform mission and generating from the emitter signal measurement the emitter bearing, estimating from the emitter bearing the emitter speed as a continuous function of emitter range, and determining the emitter range consistent therewith by comparing the continuous emitter speed with the one or more speed derived from the performance data base.

16. The method as claimed in claim 15, further comprising the step of:

assigning an accuracy figure of merit to the range estimate, where the accuracy is determined from the predicted variance in the discrete speed estimate and the continuous speed function.

17. The method as claimed in claim 15, wherein the measured emitter signal characteristics include frequency, time, and phase characteristics.

18. The method as claimed in claim 15, wherein the emitter identification, platform association, and derived kinematics are not unique and further comprising the steps of:

estimating for each emitter-platform-mission-kinematic association, a set of optimum discrete speeds;

assigning a probability value to each speed indicating the probability of a correct speed relative to the remaining speeds in the set of optimum discrete speeds, wherein the probability value is determined based on the probability of radar identification and radar-platform association;

determining the emitter range corresponding to each speed in the set of optimum discrete speeds; and assigning a probability value to the range estimate corresponding to the speed probability.

19. The method as claimed in claim 18, wherein the determining the emitter range step is performed by comparison with the continuous speed.

20. The method as claimed in claim 15, further comprising the steps of:

generating a bearing, an emitter elevation angle, and an azimuth angle, wherein a discrete speed ambiguity is reduced resulting in a unique range estimate by using the elevation angle and determined discrete range to estimate the emitter platform altitude;

comparing the estimated altitude with the altitude associated with the discrete speed in the performance data base; and accepting the range estimate only if the estimated altitude and data base altitude are consistent.

21. The method as claimed in claim 15, wherein the estimate of speed as a function of range is generated from bearing first and second derivatives with respect to time, wherein the derivatives are estimated from the bearing measurement and incorporating into the speed estimate measurement of any observer acceleration occurring during the bearing measurement period including any emitter acceleration predicted by the particular kinematic regime.

22. The method as claimed in claim 15, wherein the bearing first and second derivatives with respect to time are estimated from two or more long baseline interferometer phase measurements differenced between phase measurement update times such that any fixed phase measurement bias errors cancel in the differencing.

23. The method as claimed in claim 22, wherein a short baseline interferometer measurement is used to predict phase on the long baseline interferometer baseline, and hence resolve the long baseline interferometer phase difference measurement modulo $2\pi$ integer ambiguity.

24. A computer-readable medium comprising:

a data structure for an emitter-platform association data base;

a data structure for a performance data base;

at least one sequence of machine executable instructions in machine form, wherein execution of the instructions by a processor cause the processor to:

determine characteristics of a measured emitter signal;

generate a set of parameters characterizing a specific emitter as a signal source based on the determined characteristics;

identify a most probable platform including the emitter based on the generated parameters and the emitter-platform association data base and associate the emitter operating mode and the corresponding specific platform with a particular kinematic regime; and utilize the performance data base to (1) derive based on the kinematic regime one or more speed values best adapted to the platform mission, (2) generate based on the emitter signal measurement the emitter bearing, (3) estimate from the emitter bearing the emitter speed as a continuous function of emitter range, and (4) determine the emitter range consistent therewith by comparing the continuous emitter speed with the one or more speed values derived from the performance data base.

25. The medium as claimed in claim 24, further comprising instructions which, when executed by the processor, cause the processor to:

assign an accuracy figure of merit to the range estimate, wherein the accuracy is determined from the predicted variance in the discrete speed estimate and the continuous speed function.

26. The medium as claimed in claim 24, wherein the measured emitter signal characteristics include frequency, time, and phase characteristics.

* * * * *